United States Patent
Ledoux et al.

(10) Patent No.: US 9,527,104 B2
(45) Date of Patent: Dec. 27, 2016

(54) METHOD AND DEVICE FOR PROCESSING OF GRANULES

(71) Applicant: Yara International ASA, Oslo (NO)

(72) Inventors: Francois Ledoux, Parisis (FR); Luc Vanmarcke, Lembeke (BE); Howard Volke, Terneuzen (NL); Peter de Bakker, Hulst (NL); Remco de Fouw, Terneuzen (NL); Roeland Elderson, Axel (NL)

(73) Assignee: YARA INTERNATIONAL ASA, Oslo (NO)

( * ) Notice: Subject to any disclaimer, the term of this patent is extended or adjusted under 35 U.S.C. 154(b) by 64 days.

(21) Appl. No.: 14/270,620

(22) Filed: May 6, 2014

(65) Prior Publication Data

US 2014/0318446 A1 Oct. 30, 2014

Related U.S. Application Data

(62) Division of application No. 12/989,821, filed as application No. PCT/NO2009/000164 on Apr. 28, 2009, now Pat. No. 9,199,265.

(30) Foreign Application Priority Data

Apr. 28, 2008 (NO) .................................. 20082007

(51) Int. Cl.
B05B 17/00 (2006.01)
B05C 13/02 (2006.01)
(Continued)

(52) U.S. Cl.
CPC .. *B05C 9/12* (2013.01); *B01J 2/16* (2013.01); *B05C 3/02* (2013.01)

(58) Field of Classification Search
USPC ............ 118/303, 712, DIG. 5; 427/213, 215, 427/421.1; 209/139.1, 474
See application file for complete search history.

(56) References Cited

U.S. PATENT DOCUMENTS 2,586,818 A * 2/1952 Viggo ........................ B01J 2/16
 118/DIG. 5
3,342,587 A * 9/1967 Goodrich et al. ...... B22F 1/025
 427/215
(Continued)

FOREIGN PATENT DOCUMENTS

CN 86104552 1/1987
CN 2056868 5/1990
(Continued)

OTHER PUBLICATIONS

International Search Report issued Aug. 11, 2009 in International (PCT) Application No. PCT/NO2009/000164.
(Continued)

*Primary Examiner* — Yewebdar Tadesse
(74) *Attorney, Agent, or Firm* — Wenderoth, Lind & Ponack, L.L.P.

(57) ABSTRACT

A method for processing of granules, by forming at least one injection zone in a fluidized bed where a feed stream of seed particles is contacted or coated by a liquid product by simultaneous injection of the feed stream of the seed particles and a feed stream of the liquid product, forming at least one granulation zone in the fluidized bed where the contacted or coated seed particles may be at least one of dried, shaped, and cooled to form granules, extracting the granules from the at least one granulation zone and sorting the extracted granules into undersize granules, on-size granules, and oversize granules, passing the on-size granules to post-processing treatment, removing the oversize granules, and passing the undersize granules back into the feed stream (Continued)

of the seed particles, wherein the extracted granules are made to pass through at least one classifier located in the at least one granulation zone.

8 Claims, 6 Drawing Sheets

(51) Int. Cl.
*B05C 9/12* (2006.01)
*B01J 2/16* (2006.01)
*B05C 3/02* (2006.01)

(56) References Cited

U.S. PATENT DOCUMENTS

| | | | |
|---|---|---|---|
| 3,748,103 A * | 7/1973 | Bean et al. | B01J 2/16 159/4.04 |
| 4,118,524 A | 10/1978 | Saeman | |
| 4,902,210 A | 2/1990 | Shibata | |
| 4,946,654 A | 8/1990 | Uhlemann et al. | |
| 5,213,820 A | 5/1993 | Uhlemann et al. | |
| 5,345,896 A | 9/1994 | Hyppanen | |
| 5,747,441 A | 5/1998 | Domburg et al. | |
| 6,253,465 B1 | 7/2001 | Ichitani et al. | |
| 6,298,579 B1 | 10/2001 | Ichitani et al. | |
| 2003/0098264 A1 | 5/2003 | Ingels et al. | |

FOREIGN PATENT DOCUMENTS

| | | |
|---|---|---|
| CN | 1167650 | 12/1997 |
| CN | 1551797 | 12/2004 |
| DE | 12 98 960 | 7/1969 |
| EP | 0 304 192 | 2/1989 |
| JP | 10-158084 | 6/1998 |
| RU | 2 233 699 | 3/2004 |
| WO | 97/02887 | 1/1997 |
| WO | 01/43861 | 6/2001 |

OTHER PUBLICATIONS

Patent Cooperation Treaty (PCT) Written Opinion of the International Searching Authority issued Aug. 11, 2009 in International (PCT) Application No. PCT/NO2009/000164.
Norwegian Search Report dated Nov. 10, 2008 issued in Norwegian Application No. 20082007.
Fertilizer Manual, IFDC, Kluwer Academic Publishers, Edition 1998, pp. 269 and 297.
"Fair Wind for FB Technology," Nitrogen and Syngas, Jul.-Aug. 2006, p. 41-47.
Chinese First Office Action (with English translation) issued Jan. 23, 2013 in corresponding Chinese patent application No. 200980115040.8.
International Search Report issued Aug. 18, 2010 in International (PCT) Application No. PCT/NO2009/000164.

* cited by examiner

METHOD AND DEVICE FOR PROCESSING OF GRANULES

The present application is a divisional application of U.S. patent application Ser. No. 12/989,821, filed Oct. 27, 2010, the entirety of which is hereby incorporated by reference. Application Ser. No. 12/989,821 was published as U.S. Pre-Grant Publication Number 2011/0159180 on Jun. 30, 2011, and the entirety of this publication is hereby incorporated by reference.

BACKGROUND OF THE INVENTION

1. Field of the Invention

This invention relates to a method and device for processing of granules of solidified salts.

2. Description of the Related Art

Particulate matter of solidified salts is widely used in many fields, i.e. as fertilizers in agriculture, additives in industrial process chemistry, de-icing aid of roads, etc. For many applications, consumers are in need of particulate matter with a specific particle size distribution and which is substantially free flowing after storing and transportation.

Fluidized bed spray granulation is a commonly used technique for producing homogeneous, evenly shaped granules originating from a liquid product or products, e. g. solutions, suspensions, slurries, melts and emulsions. However, fluidized bed spray granulation processes will usually yield granules out of the granulator with various sizes, where some of the granule sizes will be outside a desired size interval. The granules with acceptable sizes are often called on-size, i.e., corresponding to the size desired for the final product. The granules with sizes larger than desired are often called oversize, while the granules with sizes smaller than desired are often called undersize. On-size granules will be processed further, while undersize and oversize granules are typically recycled back to the granulator, eventually including handling and processing in the recycle loop.

Typically, the undersize granules might be directly fed back to the granulator (or after, e.g., cooling or drying if required by the process), in order to be further enlarged to reach the desired diameter range (on-size product); While the oversize granules will typically be crushed and then recycled to the granulator under solid form (possibly after some other intermediate process steps), or molten/dissolved to be recycled back to the granulator as liquid to be sprayed.

Product recycled back from the screens to the granulator under solid form will be hereinafter referred to as external recycling.

This recycling can sometimes be a necessity for process reasons, for example, to keep the system "in balance" (heat balance, water balance, etc). However, in most cases, this recycling is a result of non-ideal behavior of the granulation process and the fact that all particles do not have the desired size, and is therefore an unnecessary cost and a limitation of the process.

Generally speaking, recycling means higher investment costs and higher operating costs. Recycling requires processing, handling (conveyors, elevators, etc.), utilities consumption (electricity consumption because of, e.g., handling equipment; or heat consumption for, e.g., reheating the product to reach the desired temperature in granulator, etc.). Thus, the recycling should be minimized, which is one of the main advantages that this invention provides.

For example, in the case of granulation of urea for fertilizer purposes, customers typically want granules with diameters between 2 and 4 mm. Particles exiting the granulator with sizes below 2 mm will therefore be considered as undersize, while particles above 4 mm will be considered as oversize. Some oversize particles (lumps, for example) will be re-molten or dissolved, while most will be crushed to supply to the granulator necessary seeds for granulation. In such cases, external recycling is typically of 0.5:1 to 1:1, i.e., for 1 kg of on-size product exiting the granulation loop, between 0.5 to 1 kg of product (undersize and crushed oversize) are recycled back to the granulator.

Conventional continuous fluidized bed spray granulators will typically have a simplified process flow as indicated in FIG. 1 (auxiliary fluids, such as a fluidizing medium, utilities, etc., and their specific processing (e.g. heating, cooling, conditioning, cleaning, etc.) are not represented for simplification purposes). Reference numeral 1a represents a supply of small granules of the product or other seed particles (also called gem particles), if any, which are to be coated with the liquid product or products. 1b is the supply of the liquid product(s). Step 2 is a granulation zone where the seed particles are contacted with a spray of the liquid product and initially shaped and dried. Step 3 is further processing of the granules, which typically includes further drying and/or shaping and/or cooling of the granules. Step 2 and 3 constitute the granulation process and both may take place in a common fluidized bed. Step 4 is an optional process step prior to screening; for example, cooling, drying, etc. Step 5 is screening of the granules exiting the granulation process, 5a is the fraction of oversize granules, 5b is the fraction of undersize granules, and 5c is the fraction of on-size granules that are sent to step 6 for post-granulation processing to form the finished product 7.

Undersize granules 5b are sent from screening 5 to processing step 9 and recycled into injection zone 2. Steps 5/8/9 constitute the recycle loop. Oversize granules 5a are sent to processing step 8 to be recycled back to the injection zone. Step 8 is a treatment step of the oversize granules 5a. This treatment may be to make them smaller sized particles by crushing, to melt them to form liquid product to be sprayed into injection zone, or discharge them as large granules for external applications. Step 9 is an optional process step for processing the undersize granules 5b before re-entry into the seed stream.

As an example of a fluidized bed granulation process, please refer to a typical flow sheet of a urea granulation plant and urea granulator schematic representation in Fertilizer Manual, IFDC, Kluwer academic publishers, edition 1998, Ch 9, pp. 269 and 270, or in Nitrogen and Syngas, Jul.-Aug. 2006, p 42.

Examples of fluidized bed spray granulation are given in, e.g., U.S. Pat. No. 5,213,820, and examples of fluidized spray granulation with a classifier are given in, e.g., WO 01/43861.

WO 01/43861 describes a fluidized bed spray granulator including a classifier for classifying the granules comprising a set of adjacent fluidized zones divided by inclined walls. The design of the granulation chamber is asymmetric, i.e., it is divided into several compartments by tilted baffle plates. The segregation is obtained by circular motion of the particles; the larger particles will tend to move towards the outlet while the lighter particles will tend to move towards the inlet of the bed, back to the growing zone where they can be enlarged. The document claims that all necessary recycling is made by the classifier, there is no external recycling.

WO 97/02887 discloses a fluidized bed classifier including a set of baffles in the bed to obtain vertical segregation when operating with gas velocities causing gas bubbles in the bed. The baffles have the effect of preventing particles from following the rising gas bubble up through the bed, and thus disturb the segregation effect.

SUMMARY OF THE INVENTION

A main objective of the invention is to provide a method for fluidized bed spray granulation of liquid products with an improved production rate of granules.

A second objective of the invention is to provide a method for fluidized bed spray granulation of liquid products with an improved production rate and/or an improved quality of the granules.

Another objective is to provide a granulator which performs the method according to the main objective or the second objective.

The objectives of the invention may be obtained by the features as set forth in the following description and or in the appended claims.

DETAILED DESCRIPTION OF THE INVENTION

The invention is based on the realization that the increase of the production rate of granules obtained by use of a classifier in the fluidized bed may be further enhanced by employing a heat exchanger in the classifier, and thus obtaining an enlarged heat transfer rate. The enlarged heat transfer rate may be beneficial both for supplying or extracting heat to and from the fluidized bed; e.g., in the case of crystallizing a melt, it is beneficial to extract more heat, while in the case of, e.g., an aqueous solution, it is beneficial to supply more heat to evaporate the water from the solution. The following description of the invention is based on a system where extra heat removal is of potential interest, but the invention may also be applied to systems where an increased heat supply may be of interest.

In one aspect, the invention relates to a method for formation of granules by fluidized bed spray granulation of a liquid product, comprising the following process steps:
 forming at least one injection zone in a fluidized bed where a feed stream of seed particles is contacted/coated by the liquid product by simultaneous injection of the feed stream of the seed particles and a feed stream of the liquid product in the form of a spray of dispersed liquid droplets,
 forming at least one granulation zone in the fluidized bed where contacted/coated seed particles may be dried and/or shaped and/or cooled to form granules,
 extracting granules from the at least one granulation zone(s) and sorting the extracted granules into three fractions; undersize granules with diameters smaller than the desired size range, on-size granules with diameters within the desired size range, and oversize granules with diameters larger than the desired size range,
 passing the fraction of on-size granules to post-processing treatment for forming the product granules,
 passing the fraction of oversize granules to means for removing them from the granulation process, and
 passing the fraction of undersize granules back into the feed stream of seed particles, wherein
 the granules are made to pass through at least one classifier placed in the at least one granulation zone(s) of the fluidized bed, which segregates the granules according to size and which passes at least a part of the segregated undersize granules back into the injection zone(s) for further enlargement.

Figure 1:
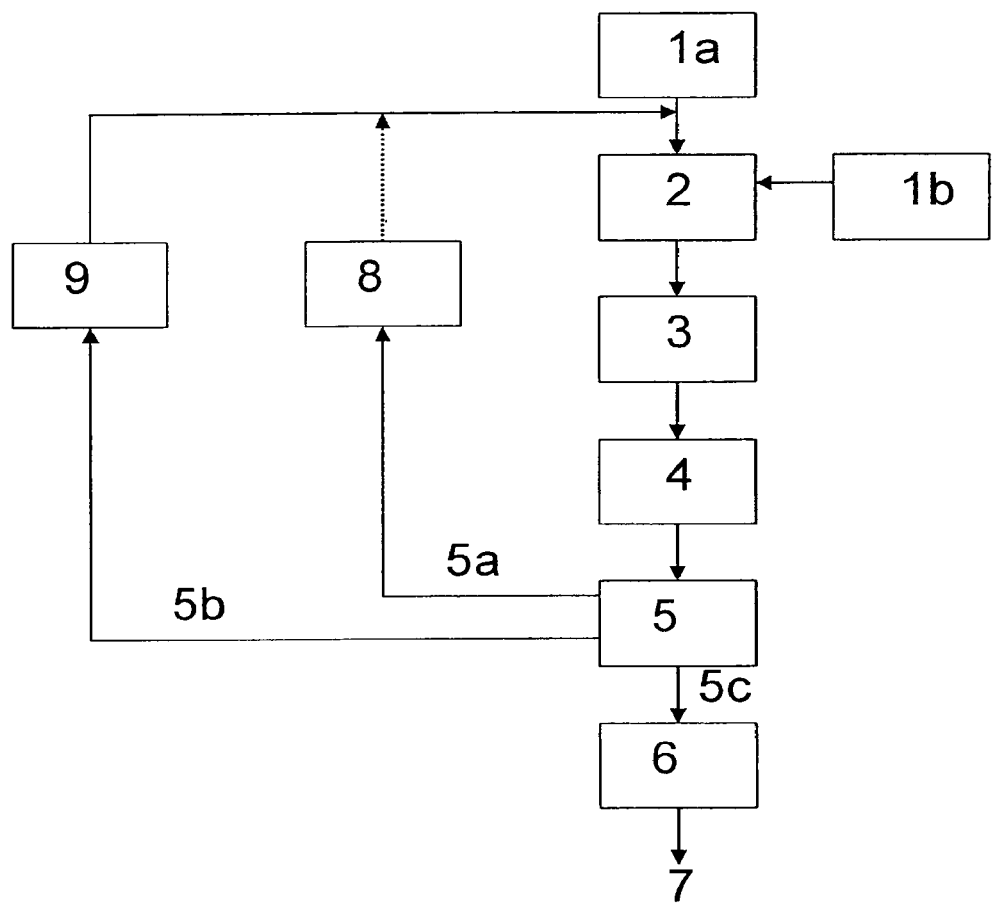
FIG. 1 is a flowchart showing a process flow of a typical prior art fluidized bed spray granulator.
Figure 2:
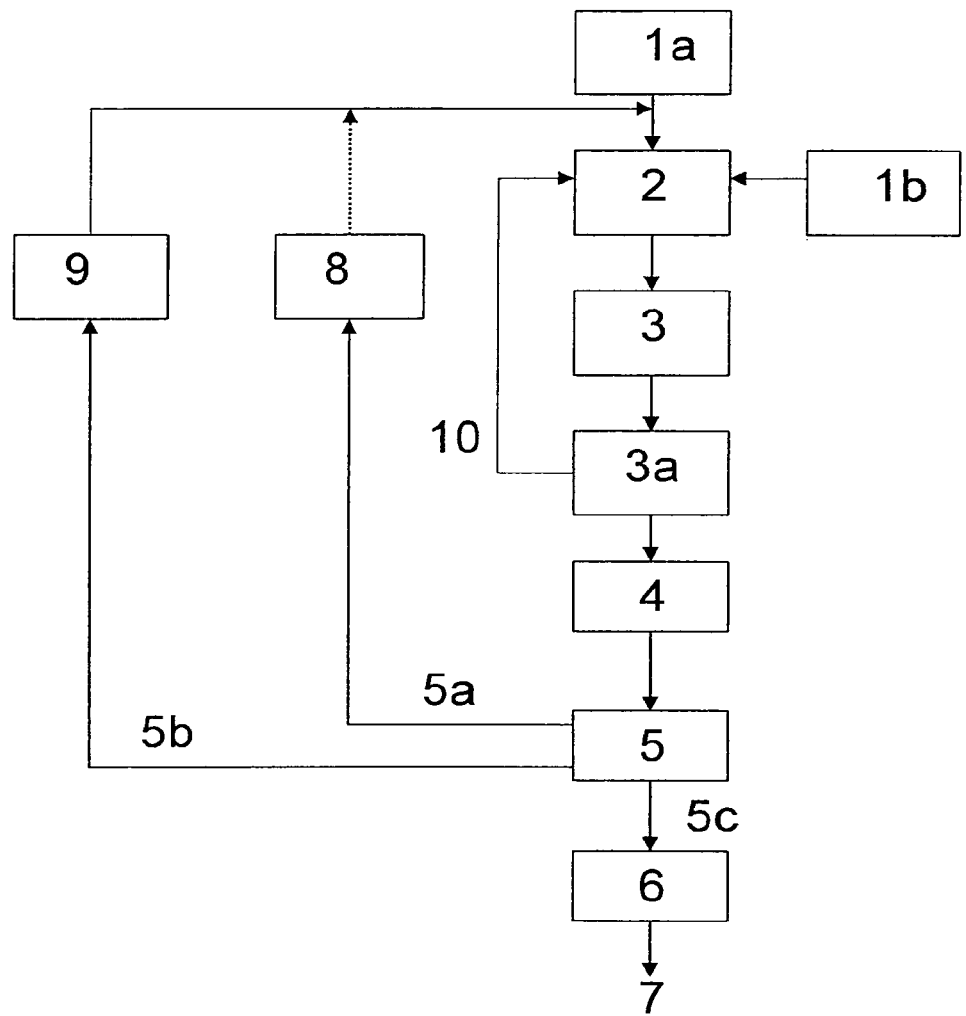
FIG. 2 is a flowchart showing a process flow according to an embodiment of the invention.

By "removing oversize granules from the granulation process" as used herein, we mean that the oversize granules are prevented from re-entering the injection zone(s). This may be obtained by one or more of the following process steps: by crushing them to undersize granules which are then passed to the feed stream for seed particles, by passing the oversize granules to the urea melt and thus recycling the oversize as liquid product, or by discharging the oversize granules to external facilities for end uses. A schematic process flow of the invention according to the first aspect is shown in FIG. 2. The process scheme is identical to the process scheme given in FIG. 1 representing prior art, except that a step denoted by reference number 3a and a process line 10 are inserted. The process step 3a is the classifying of the granules in the granulator, and the process line 10 is the recirculation of at least a part of the classified undersize granules back into the injection zone(s) of the granulator. Process line 10 is an internal recirculation of undersize granules, as opposed to the external loop represented by reference numerals 5, 8, and 9. The arrow from box 8 is given in a broken line to indicate that this recirculation is an optional feature.

In a second aspect, the invention relates to a method comprising the method according to the first aspect, and which also comprises extracting heat from (respectively supplies heat to) the fluidized zone in the classifier by use of one or more heat exchangers. The classifier and the heat exchanger may also be combined, i.e., in the form of heat exchanger tubes extending in a distance from each other across the horizontally oriented cross-sectional area of the classifier and additionally acting as a classifier. The heat exchanger needs not to be placed at the same horizontal level as the classifier, but may be placed at several heights of the classifier.

The use of a classifier which segregates the granules in the fluidized bed according to size and which passes at least a part of the fraction of undersize granules back into the injection zone(s) for further enlargement gives several benefits.

One benefit is the reduction of external recycling, which gives the opportunity to de-bottleneck the external recycle equipment and also lessens the investment and operation costs of a production plant. This feature makes it possible to increase the production rate compared to conventional similarly sized granulators, since the alleviation of the bottleneck of the external recirculation allows increasing the product flow through the granulator. A reduction of about ⅓ of the external recycle has been obtained in pilot tests, showing that the internal recycling may provide a substantial reduction of the external recycle, and thus the load on the recycle equipment (cooling table, screens, crushers, elevators, etc.).

Generally, the temperature in the spraying zone of fluidized bed spray granulators should be as homogeneous as possible at an ideal optimum temperature, which typically should be as warm as possible to promote the drying effect (e.g., evaporation of the water or solvent from the deposited liquid product) but not too warm in order to avoid scaling and subsequent plugging of the equipment. However, due to reintroduction of external recycled granules, the injection zone(s) close to the inlet(s) tends to be colder than the remaining area of the injection zone(s) and thus result in an inhomogeneous temperature profile in the injection zone(s). The tendency of the external recycle to create an inhomogeneous temperature profile may be alleviated by the feature of internal recycling, both in that the injection of the relatively cold external recycle is reduced and in that the internal recycling makes it possible to feed relatively cold internally recycled granules at other sections of the injection zone(s) than the inlet(s). Control of the cooling medium in the heat exchanger allows adjusting the temperature of the internal recycling at a desired level. Thus, the disturbance at the inlet of the granulator due to the external recycling can be lowered, and the temperature in the whole injection zone can be more homogeneous. This makes possible an increased quality of the granules and/or an increased drying ability.

An unexpected effect of the second aspect of the invention is that the use of heat exchanger tubes in the classifier did not result in a significant reduction of the temperature of the on-size and oversize granules leaving the outlet of the granulator. Instead, it was observed that the segregated undersize granules at the top of the granulator were significantly cooled. This unexpected effect means the homogenisation effect on the temperature profile of the injection zone(s) may be enhanced by use of a heat exchanger in the classifier, in that the extraction of heat in the classifier gives a further cooling of the granules such that the temperature in the injection zone can be more homogeneous. Also, the use of a heat exchanger will increase the heat extraction from the granulation zone of the fluidized bed in addition to the ordinary heat extraction by, e.g., water evaporation from the sprayed liquid and by fluidization medium, e.g., air. Depending on whether the bottleneck is the heat balance of the granulator or the quality, the feature of increased heat extraction may enhance the production capacity or the quality, respectively. This feature may also be exploited to give a combination of increased productivity and improved quality.

In a third aspect, the invention relates to a granulator for fluidized bed spray granulation of a liquid product, comprising:
- a granulator compartment with a fluidizing bed comprising i) one or more injection zone(s) (2) where a stream of seed particles is contacted/coated by the liquid product, and ii) one or more granulation zone(s) (3) where the particles are dried, and/or shaped, and/or cooled into solid granules,
- means for introducing a feed stream (1b) of the liquid product into the one or more injection zone(s) in the form of a spray of dispersed liquid droplets,
- means for introducing the feed stream (1a) of seed particles into the one or more injection zone(s) (2) such that the particles are contacted/coated with the liquid product,
- means (5) for extracting granules from the one or more granulation zone(s) and sorting the extracted granules into three size fractions; undersize granules (4c) with diameters smaller than the desired size range, on-size granules (4b) with diameters within the desired size range, and oversize granules (4a) with diameters larger than the desired size range from the one or more granulation zone(s) (3),
- means (6) for passing the fraction of on-size granules (4b) to post-treatment equipment for forming product granules (7),
- means for removing the fraction of oversize granules from the granulation process, and
- means (5a) for admixing the fraction (4c) of undersize granules into the feed stream (1a), wherein
the fluidized bed comprises a classifier (3a) in the one or more granulation zone(s) and which segregates the granules according to size, and which passes at least a fraction of the segregated undersize granules in the classifier back to the one or more injection zone(s).

The means for removing the fraction of oversize granules may comprise one or more of the following: means for crushing them to undersize granules and then passing the crushed granules to the feed stream for seed particles, means for passing the oversize granules to the urea melt and thus recycling the oversize as liquid product, or means for discharging the oversize granules to external facilities for end uses.

In a fourth aspect, the invention relates to a granulator comprising the granulator of the third aspect of the invention and which also comprises a classifier which contains one or more heat exchanger tubes extending in a distance from each other across the horizontally oriented cross-sectional area of the classifier. The heat exchanger tubes do not need to be placed at the same horizontal level of the classifier, but may be placed at several heights of the classifier.

The classifier according to the fourth aspect of the invention has a benefit in that the heat exchanger tubes have an effect of retaining particles/granules entrained by rising gas bubbles in the fluidized bed. This is beneficial since air bubbles tend to provide an overly vigorous, vertically oriented mixing leading to reversal of the segregation or classifying effect of the classifier. For many applications, for example, fertiliser granules of urea, the particles tend to have sizes and densities that classify them as Group B or D according to Geldart Classification system (in D. Geldart, Powder Technology, 7, 285 (1973); 19, 153 (1961)), i.e., particles that will fluidize properly only under bubbling fluidization, thus not in favor of classifying. On the contrary, these particles usually fluidize only in shallow beds with formation of large exploding bubbles or spouting behaviour.

Thus, for granules of Geldart Groups B and D, the classifier may advantageously be equipped with a number of more or less rod-shaped elements placed in a distance apart from each other and in a pattern which more or less covers the cross-sectional area of classifier seen from above. Air bubbles rising through the fluidized bed will have a high probability of encountering one or more of these rod-shaped elements, leading to retaining of entrained particles in the gas bubbles. The vertically oriented mixing effect of the air bubbles is thus reduced, preserving the classifying effect of the classifier.

The term "injection zone" as used herein means a defined zone in the fluidized bed of the reactor where the seed particles that are being fed to the zone are suspended and mixed in the fluidizing medium, and where the particles are brought into contact with and thus coated by the small droplets of the injected liquid product. Thus the injection zone is the initial phase of the granulation process.

The term "granulation zone" as used herein means a defined zone in the fluidized bed that arises when coated granules exiting the injection zone are suspended and mixed in the fluidizing medium, and where the temperature of the fluidized bed is reduced such that the coating of the particles are solidified, optionally also dried by the fluidizing medium and shaped by numerous collisions with other particles to form granules.

The term "seed particle" or "seed" as used herein means any solid particle with a particle size smaller than the desired granules and which is made of a material that may be wetted, and thus coated, by the liquid product sprayed in the injection zone. A synonymous and much used term for "seed particle" or "seed" is "gem particle". Usually, the seed particles will be small solid particles of the product material, but may also be of a different material.

The term "granule" as used herein means a particle that has been coated by the liquid product and then solidified/dried and shaped in the fluidized bed of the granulator to form solid particles with a core (seed particle) and an outer layer of the coating (the product).

The term "particle size" or "granule size" as used herein means mean mass particle diameter.

The term "liquid product" as used herein means any chemical compound or mixture or compounds or mixtures that may be sprayed in liquid state into a fluidized bed and contacted with the seed particles to form a coating that will solidify to form a solid outer layer of the seed particles upon drying and/or cooling during the stay in the fluidized bed of the granulator. The liquid product may be solutions, suspensions, slurries, melts and emulsions of salts, polymers, waxes, etc.

The term "external recycling" as used herein means a recycling loop of granules that are located outside the granulator. That is, the external recycling loop extracts granules from the granulation zone of the granulator and then reintroduces them into the one or more injection zones for further enlargement by being given a new layer of coating. The external recycling loop may include auxiliary process equipment for screening the granules, crushing granules larger than the desired product granules, means for removing agglomerates, means for further drying of the granules, means for transporting granules, etc. The invention may employ any known and conceivable recycling loop known to a skilled person in fluidized bed spray granulation.

The term "classifier" as used herein means any device/machine able to operate within the granulation zone(s) of the fluidized bed and which is able to segregate the fluidized granules according to size and/or density differences.

Typically, there exist obstacles to avoid in bubbling fluidization [such as a bundle of horizontal tubes (cf. the classifier used in this development), or non horizontal tubes, or baffles (bundle of baffles, perforated horizontal baffles, grids, etc.)], or a system to create selective product circulation (e.g., inclined baffles as per WO 01/43861).

The term "heat exchanger" as used herein means any plate or tubular type heat exchanger placed in the fluidized bed such that a heat exchanger medium may pass through the interior of the heat exchanger and exchange heat with the fluidizing medium flowing at the outside of the heat exchanger. The cross section of the tubes may have any shape from circular to any irregular shape; examples of cross sectional shapes include but are not limited to square, rectangular, elliptic, wing shaped, etc. The heat exchanger and classifier can therefore be combined into one common device, as described in the examples of this invention: a bundle of heat exchanger tubes with a square cross section, additionally acting as a classifier (see FIG. 4).

The invention will be described in further detail by way of an example of an embodiment of the invention intended for production of urea granules. This embodiment should not be considered as a limitation of the invention. The invention is a general method and granulator for producing granules from a liquid product, including but not limited to fertilizer granules.

The example embodiment is a granulator according to the forth aspect of the invention, intended for production of urea fertilizer granules from liquid urea melt. The granulator is shown schematically in FIG. 3. The figure shows the granulator from the side, and shows a reactor 10 with a fluidized bed formed on top of an air-distribution grate 11 when fluidization air 17 is made to pass through the grate 11. The granulator compartment is formed as a vertically oriented shaft with a rectangular horizontal cross section and which narrows in a funnel shape at the upper portion, whereby the funnel represents an exit for the fluidization air, and it is divided in two sections by a partition wall 18 into an injection zone 12 and a granulation zone 13. In the granulation zone, there is placed a classifier 21 comprising a set of heat exchanger tubes 20.

Seed granules of urea are introduced into the injection zone 12 through inlet 14 and made to contact and be coated by atomised liquid urea through inlet 15. After being coated and initially dried and formed, the granules pass through the opening between the partition wall 18 and the classifier 21 and enter the granulation zone 13 where they are suspended and subsequently segregated by the classifier 21. The smallest and lightest granules tend to gather at the top section of the classifier 21, and at least a portion of them will flow over the top 19 of the classifier and re-enter into the injection zone 12 where they will be contacted and coated with the liquid product. The side of the top section of the classifier facing the injection zone may advantageously be equipped with an overflow. The on-size and oversize granules tend to gather at the lower section of the classifier and will flow out of outlet 16 and pass to equipment for sorting the extracted granules into three size fractions; undersize, on-size, and oversize granules (not shown). The classifier is equipped with six rows of heat exchanger tubes 20, in which a heat exchanging medium flows at a temperature below the fluidizing air in order to extract heat from the fluidizing air flowing outside tubes 20.

Verification Tests

Figure 3:
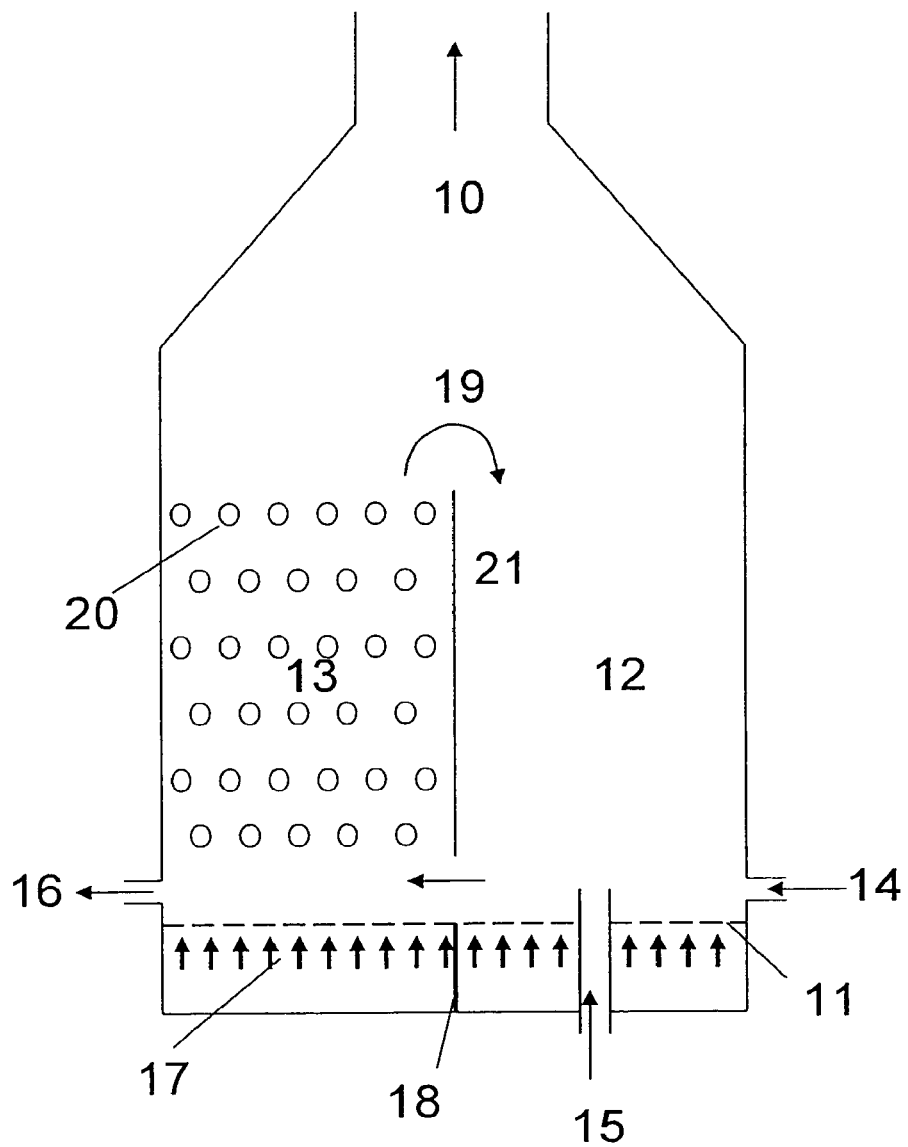
FIG. 3 is a schematic of a granulator according to an embodiment of the invention.

The effect of the invention is verified by a series of pilot tests on a granulator as shown in FIG. 3. In all tests the following parameters were employed:

| Granulator | | |
|---|---|---|
| Water concentration in melt | [wt %] | 4.5 |
| Temperature | [° C.] | 109 |
| Level/Delta P (bed + plate) | [mmwc] | 500/550 |
| Flow fluidisation air | [kg/h] | 8000 |

-continued

| | | |
|---|---|---|
| Pressure melt | [barg] | 0.9 |
| Temperature injection air | [° C.] | 132 |
| Pressure injection air | [barg] | 0.45 |
| Granulator scrubber | | |
| Density | [kg/m³] | 1110 | and:

| Granulator | | |
|---|---|---|
| Nozzle type | | Proprietary |
| Number of nozzles | | 13 |
| Screens | | |
| Mesh size under-screen | [mm] | 4.40 |
| Mesh size upper-screen | [mm] | 2.50 |
| Crushers | | |
| Gap size under-crusher | [mm] | 1.60 |
| Gap size upper-crusher | [mm] | 2.20 |
| Gap size overflow-crusher | [mm] | 3.60 |

The water used as cooling water is coming from and going back to the granulator scrubber. The scrubber is acting as cooling tower by evaporation. Typical temperatures in and out are 50° C. and 56° C., respectively.

The design data of the granulator with heat exchanging classifier is as follows:

| | | Shell side | Tube Side |
|---|---|---|---|
| DESIGN CONDITIONS | | | |
| Working pressure | barg | — | 5 |
| Design pressure | barg | 1.1 | 6 |
| Fluid working inlet temperature | ° C. | 130 | 20 |
| Fluid working outlet temperature | ° C. | 90 | 50 |
| HEAT TRANSFER CONDITIONS | | | |
| Fluid | | Granules/air | Cooling water |
| Flow rate (total) | kg/h | 10000/9 t/(h m²) | 5000:10000 |
| Pressure drop (allowable) | Bar | Max 0.206 | Max 0.034 |
| Fouling factor | m² ° C./W | 0.000528 | 0.000176 |
| Passes each shell | No: | 1 | 4 |

| BUNDLE LAY-OUT | | |
|---|---|---|
| Tubes | Pce | 320 |
| O.D. × Thk. | mm | 20 × 20 × 2 |
| Length | mm | 500 |

Figure 4:
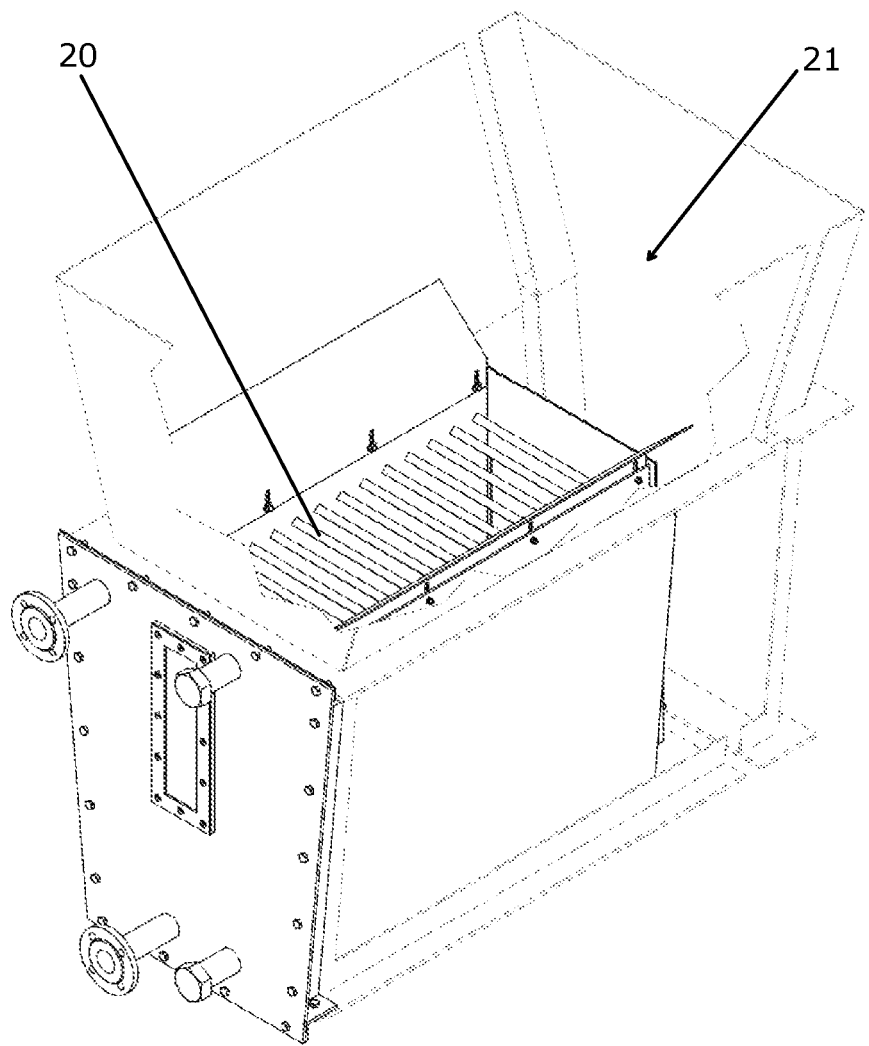
FIG. 4 is a perspective view of a pilot plant granulator according to an embodiment of the invention.

The pilot classifier of the pilot granulator described above was equipped with possibility of adjusting the height of the end wall of the classifier facing the injection zone. This adjustable wall is denoted baffle in the tables. Granulator in our pilot plant has the following dimensions:
Length: 3.09 m
Width: 0.54 m
Injection zone: 1.13 m²
Cooling zone: 0.54 m²
Total height above the fluidizing plate to the roof: 3.55 m
Air feed: lateral
Air exhaust: central vertical
A drawing of the pilot granulator is shown in FIG. 4.
The following tests were performed:

| Test number (one week test period each) | Test description |
|---|---|
| 1 | Test with different airflows to cooling chamber and different water flows to the classifier and heat exchanger tubes in the granulator, with the adjustable baffle at 850 mm from bottom plate<br>Flow of air, F(air) = 7000, 8000 and 9000 kg/m² · h<br>Flow of water, F(water) = 0 and 5000 L/h |
| 2 | First part of 2-week test with the adjustable baffle at 800 mm from bottom plate and cooling water |
| 3 | Second part of 2-week test with the adjustable baffle at 800 mm from bottom plate and cooling water |
| 4 | Standard test with the adjustable baffle at 850 mm from the bottom plate without cooling water |
| 5 | Reference test week 1 without classifier and heat exchanger tubes |
| 6 | Reference test week 2 without classifier and heat exchanger tubes |

The following parameters were measured during the tests:

| Screening analyses | |
|---|---|
| Outlet granulator | [mm, wt %] - Dp50 |
| Top FBCC | [mm, wt %] - Dp50 |
| Final product | [mm, wt %] - Dp50 |
| Chemical analyses | |
| Moisture (Karl-Fischer) | [wt %] |
| Biuret | [wt %] |
| Formaldehyde | [wt %] |
| Physical analyses | |
| Crystallization point | [° C., wt %] |
| Crushing strength PQR | [kg] |
| Bulk density loose | [g/L] |

The results of these tests are summarised in Table 1.

TABLE 1

Some measured parameters

| Test No. | H2O [%] | Biuret [%] | Formol [%] | Crushing strength [kg] | Bulk density loose [g/L] | Dp50 (Prod.) [mm] | Dp50 (GLF) [mm] | Dp50 (top FBCC) [mm] |
|---|---|---|---|---|---|---|---|---|
| 7400 | 0.23 | 0.77 | 0.47 | 3.2 | 687 | 2.70 | 2.78 | 1.98 |
| 7401 | 0.22 | 0.77 | 0.53 | 3.3 | 692 | 2.65 | 2.77 | 1.94 |
| 7402 | 0.23 | 0.76 | 0.52 | 3.3 | 692 | 2.53 | 2.66 | 1.96 |
| 7403 | 0.24 | 1.00 | 0.51 | 3.3 | 692 | 2.49 | 2.63 | 1.95 |
| 7404 | 0.25 | 0.96 | 0.51 | 3.2 | 690 | 2.41 | 2.54 | 1.89 |
| 7405 | 0.26 | 0.94 | 0.50 | 2.8 | 677 | 2.37 | 2.47 | 1.77 |
| 7406 | 0.33 | — | — | 2.4 | 675 | 2.37 | 2.46 | 1.81 |
| 7407 | 0.28 | 0.78 | 0.46 | 2.8 | 681 | 2.44 | 2.59 | 1.82 |
| 7408 | 0.25 | 0.80 | 0.51 | 3.1 | 678 | 2.42 | 2.57 | 1.80 |
| 7409 | 0.22 | 0.76 | 0.48 | 2.9 | 690 | 2.89 | 2.55 | 2.26 |
| 7410 | 0.25 | — | — | 2.6 | 692 | 2.80 | 2.39 | 2.17 |
| 7465 | 0.17 | 0.75 | 0.58 | 3.5 | 703 | 3.20 | 2.66 | — |
| 7466 | 0.22 | 0.78 | 0.46 | 3.3 | 699 | | 2.59 | — |
| 7467 | 0.22 | 0.82 | 0.50 | 3.3 | 705 | 3.19 | 2.52 | — |
| 7468 | 0.23 | 0.83 | 0.48 | 3.5 | 704 | | 2.60 | — |
| 7469 | 0.23 | — | — | 3.0 | 694 | | 2.67 | — |

Results on Classifying

Figure 5:
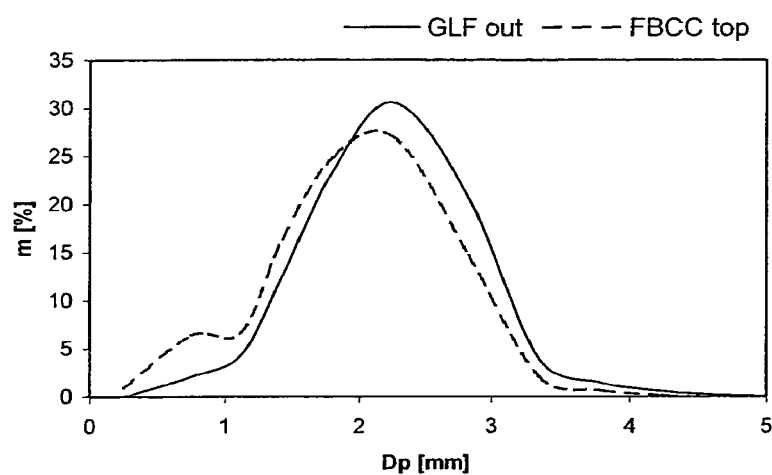
FIG. 5 is a graph showing a measured particle size distribution of granules at the top of the classifier (FBCC top) and at the outlet of the granulator (GLF out).

The results on classifying are shown in FIG. 5 which shows the particle size distribution of the particles at the top of the classifier and at the outlet of the granulator. From the figure it is clear that the Dp50 in the top of the classifier differs from the Dp50 at the bottom (outlet) of the granulator. Dp50 is the mean mass diameter of the particles. The effect of the internal recycle on the external recycle is calculated as follows:

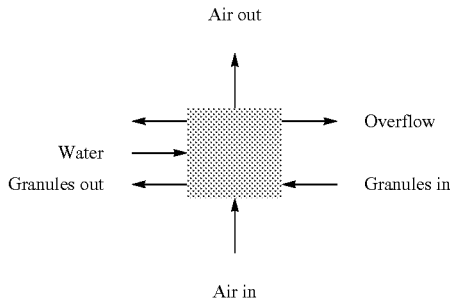

With the energy balance over the granulator with classifier and heat exchanger the overflow of particles from the cooling chamber to the injection chamber (internal recycle) can be calculated. The following equations are used to calculate the internal recycle ($F_{overflow,g}$):

$$\Delta Q(\text{granules}) = \Delta Q(\text{air}) + \Delta Q(\text{water}) \quad [1]$$

$$\Delta Q(\text{air}) = F_{air} \cdot C_{p,a} \cdot (T_{out,r} - T_{in,a}) \quad [2]$$

$$\Delta Q(\text{water}) = F_w \cdot C_{p,w} \cdot (T_{out,w} - T_{in,w}) \quad [3]$$

$$\Delta Q(\text{granules}) = C_{p,g} \cdot (F_{out,g} \cdot T_{out,g} + F_{overflow,g} \cdot T_{overflow,g} - F_{in,g} \cdot T_{in,g}) \quad [4]$$

Q means energy [kJ/h], F means mass flow [kg/h], $C_p$ means heat capacity coefficient [kJ/(kg·K)] and T means temperature [K].

A few calculated internal recycle flows are shown in Table 2:

TABLE 2

Calculated internal recycle flows

| Test week no./Date | $F_{int. rec.}$ [kg/h] |
|---|---|
| 2/19-Oct. | 10515 |
| 2/20-Oct. | 7160 |
| 3/21-Oct. | 8803 |
| 3/23-Oct. | 8199 |
| 4/30-Oct. | 9387 |
| 4/30-Oct. | 7322 |
| 4/31-Oct. | 8462 |
| 4/31-Oct. | 9308 |
| 4/1-Nov. | 7948 |

The external recycle ratio is calculated with the mass balance around the total recycle circuit (granulator, screens, crusher, etc.). The particle flows of the outlet of the screening section are manually weighted. From this the recycle ratio is calculated. F means mass flow [kg/hour].

$$\text{Recycle Ratio} = \frac{F_{fine} + F_{coarse}}{F_{final\ product}} \quad [5]$$

This classifying effect has the advantage that "smaller" particles are brought back to the injection chambers (overflow). Due to this "internal" recycle the particle size distribution and amount of the "external" recycle is influenced. In table 3 the influence of the "internal" recycle on the "external" recycle is shown:

TABLE 3

Influence of the internal recycle on the external recycle.

| | Capacity [kg/h per nozzle] | $F_{int.\ rec}$ [kg/h] | $F_{ext.\ rec}$ [kg/h] | RR [%] | $Dp50_G$ [mm] | $Sd_G$ [mm] |
|---|---|---|---|---|---|---|
| No classifier | 402 | 0 | 4924 | 96 | 2.61 | 0.73 |

TABLE 3-continued

Influence of the internal recycle on the external recycle.

| | Capacity [kg/h per nozzle] | $F_{int.\ rec}$ [kg/h] | $F_{ext.\ rec}$ [kg/h] | RR [%] | $Dp50_G$ [mm] | $Sd_G$ [mm] |
|---|---|---|---|---|---|---|
| classifier 850 mm no water | 399 | 8485 | 3548 | 71 | 2.47 | 0.69 |

TABLE 3-continued

Influence of the internal recycle on the external recycle.

| | Capacity [kg/h per nozzle] | $F_{int.\ rec}$ [kg/h] | $F_{ext.\ rec}$ [kg/h] | RR [%] | $Dp50_G$ [mm] | $Sd_G$ [mm] |
|---|---|---|---|---|---|---|
| classifier 800 mm water | 400 | 8669 | 3576 | 70 | 2.61 | 0.68 |

$F_{int.\ rec}$ is mass flow internal recycle, $F_{ext.\ rec}$ is mass flow external recycle, RR is recycle ratio, $Dp50_G$ is mean mass diameter of particles in granulator, and $Sd_G$ is standard deviation in granulator.

In table 3, it is clearly shown that the use of a classifier with heat exchanger in the granulation chamber has an influence on the classification of particles in the granulation chamber and gives a reduction of the external recycle.

Results on Cooling

Different actions, like changing the air and water flows, were performed in test week 1 to see the effect of these actions on the energy balance. The results of the different actions (airflow, water flow) are graphically shown in FIG. 5, while the performed actions and their results are explained in Table 4.

Figure 6:
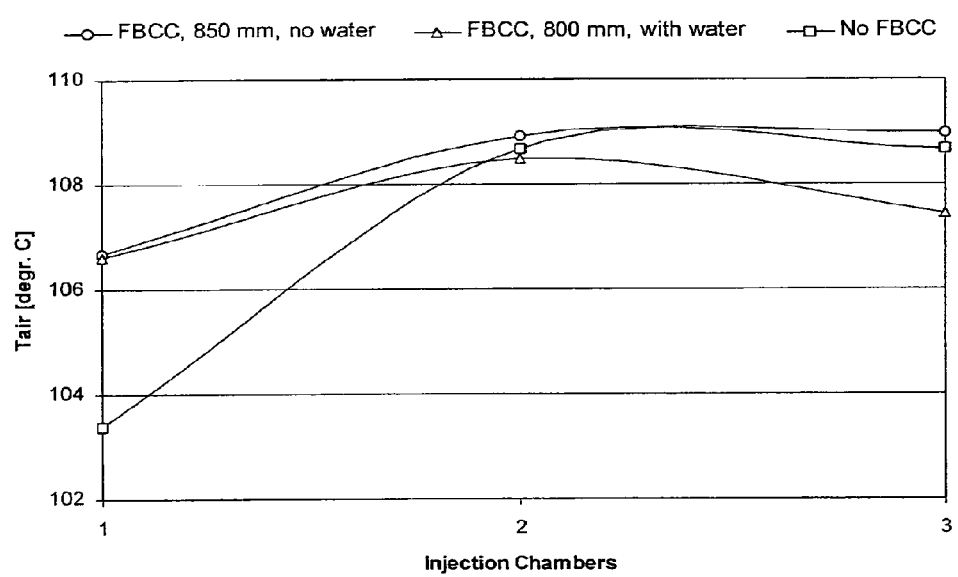
FIG. 6 is a graph showing a comparison of temperature profiles in the granulator with and without use of a classifier (no FBCC), with use of a classifier (FBCC, no water), and with use of a classifier with a heat exchanger (FBCC with water).

Due to the overflow of particles (internal recycle) from the granulation chamber and the reduction of external recycle, the input of "cold" seed material to the injection chamber is better distributed. Therefore a better temperature profile is obtained. Temperature profiles (air in expansion part) for the situations with and without classifier with heat exchanger are shown in FIG. 6.

For the test with the classifier the higher temperature in the first chamber is caused by the lower external recycle flow. Normally, in the case without the classifier, the higher external recycle flow has a large influence on the temperature in the first chamber. The small decrease in temperature in the third chamber is caused by the overflow of particles from the cooling chamber.

TABLE 4

Tests on cooling

| Day of week 1 | Time | Action | Result |
|---|---|---|---|
| 2 | 03:30 | Classifier with no cooling water | Temperature in the injection chambers; 109° C., temperature out of granulator; 87° C. |
| 2 | 12:30 | Increase water flow to 5000 L/h. Temperature granulator on remote set point (109° C.) | Temperature in the granulator (109° C.) and at the outlet (86° C.) stays the same. Temperature of the fluidization air increases (104° C.). |
| 2 | 17:00 | Reduction of air flow to 7000 kg/(m² h) in the cooling zone | "Overflow" decreases. Less cooling of injection chambers. Temperature of the fluidization air to the injection chambers decreases (104 to 85° C.). |
| 2 | 23:00 | Increase of air flow to 9000 kg/(m² h) in the cooling zone | "Overflow" increases; more cooling of injection chambers. Temperature of the fluidization air to the injection chambers increases (85 to 108° C.). |
| 3 | 05:00 | Reduction of water flow to zero L/h | Less cooling water gives warmer "overflow". Temperature of the fluidization air to the injection chambers decreases (108 to 101° C.). |
| 3 | 11:00 | Reduction of air flow to 7000 kg/(m² h) in the cooling zone | Overflow" decreases. Less cooling of injection chambers. Temperature of the fluidization air to the injection chambers decreases (101 to 65° C.). |

When a classifier with heat exchanger is used, the main effect is on the overflow to the injection chambers. The temperature of the overflow becomes colder. This means that more energy input is required in the injection chambers from the melt (capacity increase) or warmer air to keep the right granulation temperature. The air temperature at the outlet of the cooling chamber will be approximately 10° C. lower when cooling water is used, while the temperature of the product leaving the granulator will only slightly be lower.

The expected effect, to cool down the granules at the outlet of the granulator is not obtained. A probable cause can be that the particles with the "right" size have a small residence time in the cooling chamber and do not go through the cooling bank, but only use the lower part.

Results on Scaling

No scaling on the granulator or classifier was observed during the tests. Even after an 11 days run no problems were observed.

Results on Dust Emissions

No difference observed.

The dust figures were checked from the from the water flows to and from the scrubbers:

| Test week | Dust (GLF) [%] |
|---|---|
| 2 | 2.0 |
| 3 | 2.8 |

-continued

| Test week | Dust (GLF) [%] |
|---|---|
| 4 | 2.2 |
| 5 | 2.7 |
| 6 | 2.2 |

Results on Product Quality

The average product quality is given below for the runs with and without classifier in the granulation chamber.

| Analysis | Unit | Classifier 800 mm water | Classifier 850 mm no water | No classifier |
|---|---|---|---|---|
| Moisture (KF) | [wt %] | 0.23 | 0.24 | 0.23 |
| Biuret | [wt %] | 0.85 | 0.76 | 0.80 |
| Formaldehyde | [wt %] | 0.50 | 0.48 | 0.51 |
| Crushing strength | [kg] | 3.0 | 2.8 | 3.3 |
| Apparent density | [g/cm$^3$] | 1.16 | 1.16 | 1.17 |
| Bulk density Loose | [g/L] | 695 | 701 | 703 |
| Abrasion dust | [mg/kg] | 421 | 538 | 440 |

Increase of Melt Concentration.

Thanks to higher heat removal possibilities using the classifier with heat exchanger, a test with more concentrated melt was performed, using 97% melt concentration instead of 95.5%. Other parameters were kept identical as in previous experiments.

This resulted in an improved product quality for the granulation with the 97.0% urea melt concentration:

| Urea melt conc. [%] | H2O [%] | Crushing strength [kg] | Bulk density loose [g/L] | App. density [g/cm$^3$] |
|---|---|---|---|---|
| 95.5% | 0.21 | 3.3 | 703 | 1.17 |
| 97.0% | 0.19 | 4.2 | 719 | 1.20 |

Results on Process Stability

It is observed that the stability of the process improves when using the classifier. During start-up, the solid recycle stabilizes faster than in the situation without the classifier. During runs with classifier, the amount of course material was less as compared with runs without the classifier (see table below). This has a large influence on the stability, especially because the material from the crushers was very small (as mentioned before):

| | Classifier 800 mm, water | Classifier 850 mm, no water | No classifier |
|---|---|---|---|
| F(crushed) [kg/hr] | 40 | 73 | 131 |

The invention claimed is:

1. A granulator for forming granules from a liquid product, the granulator comprising:
    a reactor with a fluidizing bed comprising i) one or more injection zone(s) where a feed stream of seed particles is contacted/coated by the liquid product, and ii) one or more granulation zone(s) where the contacted/coated seed particles are dried, shaped and cooled into solid granules;
    a liquid feed inlet for introducing a feed stream of the liquid product into the one or more injection zone(s) in the form of a spray of dispersed liquid droplets;
    a seed particle inlet for introducing the feed stream of seed particles into the one or more injection zone(s) such that the seed particles are contacted/coated with the liquid product in the form of the spray of dispersed liquid droplets;
    an outlet for extracting granules from the one or more granulation zone(s) and sorting equipment for sorting the extracted granules into three size fractions; undersize granules with too small diameters compared to a desired size range, on-size granules with diameters within the desired size range, and oversize granules with too large diameters compared to the desired size range from the one or more granulation zone(s);
    transportation means for passing the fraction of on-size granules to post-treatment equipment for forming product granules;
    removal means for removing the fraction of oversize granules from the granulation process; and
    transportation means for passing the fraction of undersize granules into the feed stream of seed particles,
    wherein the fluidized bed comprises a classifier in the one or more granulation zone(s), and wherein the classifier segregates the granules according to size, the classifier passes at least a fraction of the segregated undersize granules in the classifier back to the one or more injection zone(s), and the classifier comprises two or more heat exchanger tubes, at a distance from each other, extending across a horizontally oriented cross-sectional area of the classifier.

2. The granulator according to claim 1, wherein the removal means for removing the fraction of oversize granules comprises one or more of the following:
    means for crushing the oversize granules to undersize granules and then passing the crushed granules to the feed stream of seed particles;
    means for passing the oversize granules to the feed stream of the liquid product and thus recycling the oversize granules as liquid product; or
    means for discharging the oversize granules to external facilities for end uses.

3. The granulator according to claim 2, wherein the classifier has an overflow that directs the fraction of undersize granules back to the one or more injection zone(s).

4. The granulator according to claim 2, wherein:
    the reactor is shaped as a vertically oriented shaft with a square horizontal cross section and narrows in a funnel shape at an upper portion thereof, such that the funnel represents an exit for the fluidization air; and
    the fluidization zone is formed on top of an air-distribution grate when fluidization air is made to pass through the air-distribution grate, and the fluidization zone is divided by a partition wall into an injection zone and a granulation zone.

5. The granulator according to claim 2, wherein the liquid product is a urea melt.

6. The granulator according to claim 1, wherein the two or more heat exchanger tubes are positioned at several heights of the classifier.

7. The granulator according to claim 1, wherein the classifier has an overflow that directs the fraction of undersize granules back to the one or more injection zone(s).

8. The granulator according to claim 1, wherein:
    the reactor is shaped as a vertically oriented shaft with a square horizontal cross section and narrows in a funnel shape at an upper portion thereof, such that the funnel represents an exit for the fluidization air; and the fluidization zone is formed on top of an air-distribution grate when fluidization air is made to pass through the air-distribution grate, and the fluidization zone is divided by a partition wall into an injection zone and a granulation zone.

* * * * *